United States Patent

Iglseder et al.

[11] Patent Number: 5,949,594
[45] Date of Patent: Sep. 7, 1999

[54] PROCESS FOR THE GENERATION OF INFORMATION IN SPACE

[76] Inventors: Heinrich Iglseder, Roswitha-von-Gandesheim-Weg 32, 42897 Remscheid; Wolfgang Arens-Fischer, Grovern 8a, 49577 Ankum, both of Germany

[21] Appl. No.: 08/982,460

[22] Filed: Dec. 2, 1997

Related U.S. Application Data

[63] Continuation-in-part of application No. 08/281,682, Jul. 28, 1994, abandoned.

[30] Foreign Application Priority Data

Jul. 29, 1993 [DE] Germany ............................. 43 25 426

[51] Int. Cl.$^6$ ........................................................ G02B 5/10
[52] U.S. Cl. .......................... 359/853; 359/853; 359/854; 359/855; 359/868; 343/837; 343/871; 343/880; 343/881
[58] Field of Search ...................................... 359/853, 854, 359/855, 868; 343/837, 871, 880, 881, 882; 455/12

[56] References Cited

U.S. PATENT DOCUMENTS

| | | | |
|---|---|---|---|
| 3,718,751 | 2/1973 | Landre et al. ............................ | 348/339 |
| 3,901,587 | 8/1975 | Haile ....................................... | 359/868 |
| 3,913,105 | 10/1975 | Williamson et al. ................... | 343/840 |
| 4,066,332 | 1/1978 | Kato et al. .............................. | 359/453 |
| 4,110,010 | 8/1978 | Hilton ..................................... | 359/853 |
| 4,123,160 | 10/1978 | Caputo et al. .......................... | 356/301 |
| 4,253,190 | 2/1981 | Csonka ................................... | 455/12 |
| 4,264,144 | 4/1981 | McCord .................................. | 359/868 |
| 4,777,660 | 10/1988 | Gould et al. ............................ | 359/169 |
| 4,896,165 | 1/1990 | Koizumi ................................. | 343/881 |
| 5,019,898 | 5/1991 | Chao et al. ............................. | 348/34 |
| 5,260,830 | 11/1993 | Nishida et al. ......................... | 359/634 |
| 5,290,004 | 3/1994 | Frost et al. ............................. | 248/528 |
| 5,296,974 | 3/1994 | Tada et al. .............................. | 359/885 |
| 5,424,868 | 6/1995 | Fielding et al. ........................ | 359/634 |

FOREIGN PATENT DOCUMENTS

| | | |
|---|---|---|
| 1943738 | 3/1979 | Germany . |
| 2234445 | 8/1979 | Germany . |
| 3202656 | 10/1987 | Germany . |
| 4033776 | 5/1992 | Germany . |
| 2240681 | 8/1991 | United Kingdom . |
| WO9309029 | 5/1993 | WIPO . |

OTHER PUBLICATIONS

Laser–Ubertragungsstrecken fur Satelliten. "Funkschau" Sep. 1993, pp. 68–71.
Introduction to Space Systems, By: J.C. Husson, "Electrical Communication" Jan. 1988, pp. 4–11.

*Primary Examiner*—Thong Nguyen
*Assistant Examiner*—Mohammad Y. Sikder
*Attorney, Agent, or Firm*—Sughrue, Mion, Zinn, Macpeak & Seas, PLLC

[57] ABSTRACT

A device (28) is transported into space for transmitting information from space to earth. On the device (28) there is disposed a plurality of reflectors (10) to be distributed in a raster or grid configuration on a framework (11). Of these reflectors (10), certain reflectors (10), which are selected as a function of the information to be transmitted, are brought into a position in which they reflect light beams, emanating from the sun, to the earth (26). The respective information becomes visible to an observer on the earth (26) in that the selected reflectors (10) give a sequencing of light points which corresponds to the information to be transmitted. On the other hand, the reflectors (10) which are not needed to the display of the respective information are in a position, relative to the sun, which does not allow these reflectors (10) to be perceived as light points by the observer on the earth (26). Any selectable different information may be sent in this manner, using one and the same device (28), to any selectable information regions (29) on the earth.

9 Claims, 8 Drawing Sheets

PROCESS FOR THE GENERATION OF INFORMATION IN SPACE

This is a continuation-in-part of application Ser. No. 08/281,682, filed Jul. 28, 1994, now abandoned.

The invention relates to a process for the generation of information in space.

The need exists to make information accessible to the largest possible range of persons, in a simple manner, especially for the purpose of advertising. To this end, ideas exist of bringing a luminous display panel into an orbit around the earth, so that it orbits the earth. The display panel in this case transmits especially advertising information from space, so that the advertising can be perceived on the earth (or in regions near the earth) by persons looking towards the sky. For each advertisement, a corresponding display panel must be transported into space and installed there. This leads to exceptionally high costs, which might be considered to be the reason why the former ideas of transmitting advertising from space could not be converted into practice.

SUMMARY OF THE INVENTION

Proceeding from this, the object of the invention is to provide a process by which information can be generated in space in a manner which is feasible in practice and economical.

A process for achieving this object exhibits the measure of the claims. As a result of the fact that of a plurality of reflectors disposed on a predetermined raster (matrix- or grid-like) selected reflectors are used to direct electromagnetic beams, especially solar rays, to the earth, any selectable information can be transmitted by the same device. As a result of this, one and the same device can be used to radiate, for example, different advertisements to the earth. It is no longer necessary to use a specifically associated, special device for each advertisement (or other information).

In an advantageous process, the device is brought into an orbit around the earth. In this manner, the information sent out by the device is at al times visible somewhere on the earth or in regions near the earth, by ground-based, seaborne, airborne and spaceborne observers. Particularly suitable is a so-called perpetual solar orbit. The device is situated, in this case, at all times in the region of influence of the sun, so that the sun always acts on the device with the same radiation intensity. In the cases of a sun-synchronous orbit, the information appears in each instance approximately at the same time at specified positions of the earth.

As a result of the arrangement, distributed in a raster (grid-like or matrix-like) configuration, of a plurality of reflectors on a common retaining means, to a certain extent a "writing surface" is created, on which any selectable information can be represented by an appropriate combination or sequencing of reflectors throwing light beams to the earth. Each reflector provides one light point for the observer; in this case, the reflectors in each instance sending solar rays to the earth transmit, together, the desired information to the observer.

Preferably, the reflectors are, independently of one another in relation to the retaining means, variable in their alignment (relative to the retaining means. As a result of this, it can be achieved that only specified reflectors direct the incident sunlight to the earth and thus send light points to the earth. Other reflectors, which at the instant concerned are not required for the transmission of the desired information, can be brought into a position in which either they are not acted upon by the sun or they direct the incident solar rays in a direction in which they are not visible to the observer. In this manner, by controlled relative alignments of all reflectors it is possible to form any selectable and variable representation combination, especially light point combinations which give the information which is to be transmitted in each instant. This information may comprise letters (with individual letters and also a combination of letters) and also pictorial or graphical representations.

Alternatively or even additionally, it is possible preferably to associate a darkening means with each reflector. This darkening means is designed so that it in a controlled fashion prevents or reduces solar irradiation on the reflector, so that for the observer (on the earth) the reflector either does not appear at all or appears only with reduced brightness. In this embodiment of the invention, the reflectors can, if required, be rigidly connected to the retaining means.

According to a further development of the invention, each reflector is provided with a reflecting surface the curvature of which is variable. In this manner, it is possible to focus, to defocus or just to deflect the beams emanating from the reflector.

Finally, it is provided to put together each reflector from a plurality of partial reflectors. Preferably, three partial reflectors are used, which are designed so that they convert the incident sunlight into the three spectral colors (red, green, blue). As a result of an independent adjustability (pivotability and/or alteration of curvature of the reflecting surface) of all three partial reflectors, the light beams can be overlapped so that any selectable (visible or invisible) spectral compositions are created. Using the device, it is then possible to display the desired information in any selectable colors.

BRIEF DESCRIPTION OF THE FIGURES

A preferred process and particularly advantageous embodiments of the device are explained in greater detail hereinbelow with reference to the drawing. In the drawing.

DETAILED DESCRIPTION OF THE PREFERRED EMBODIMENT

Figure 1:
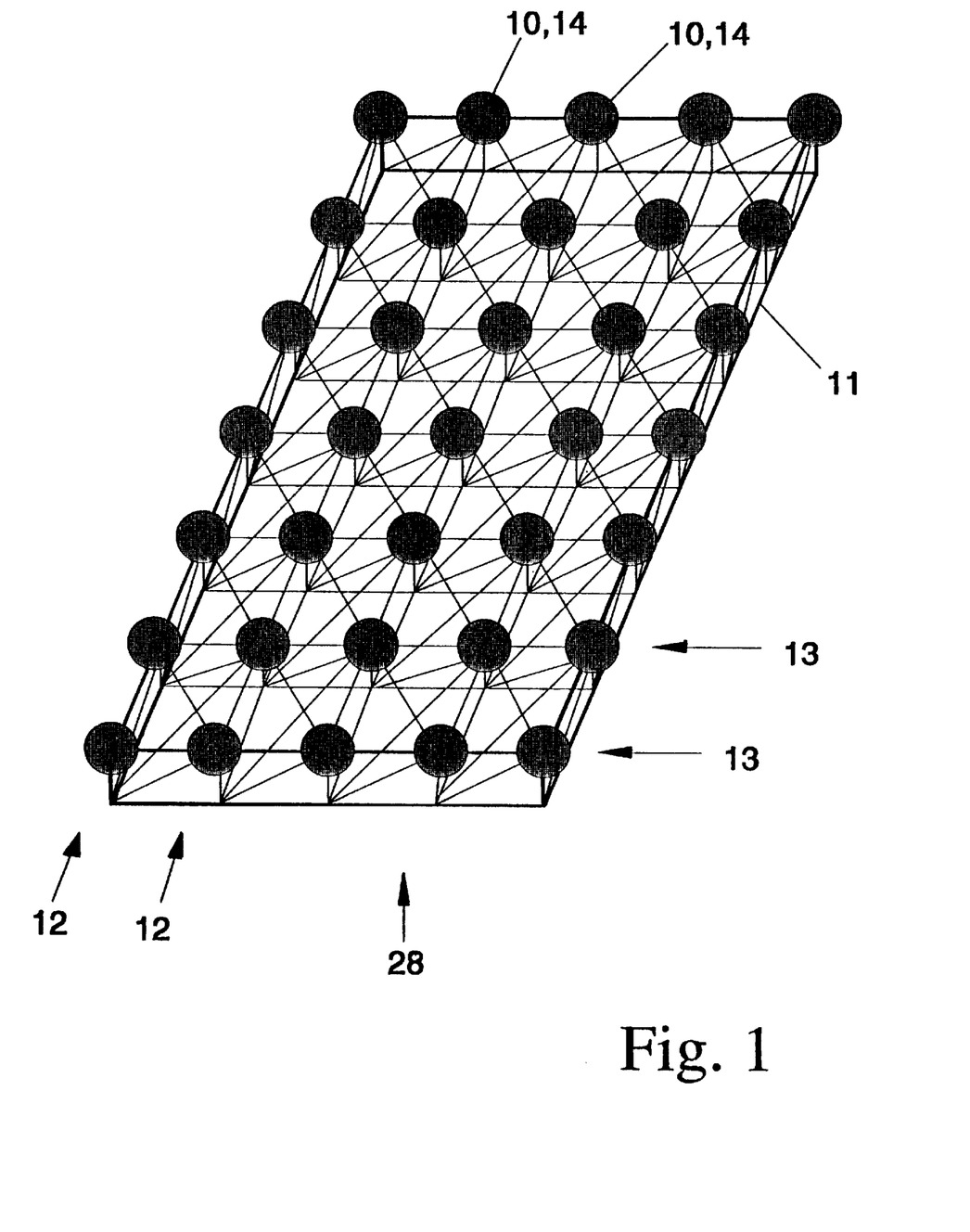
FIG. 1 shows a diagrammatic, perspective representation of the device.
Figure 2:
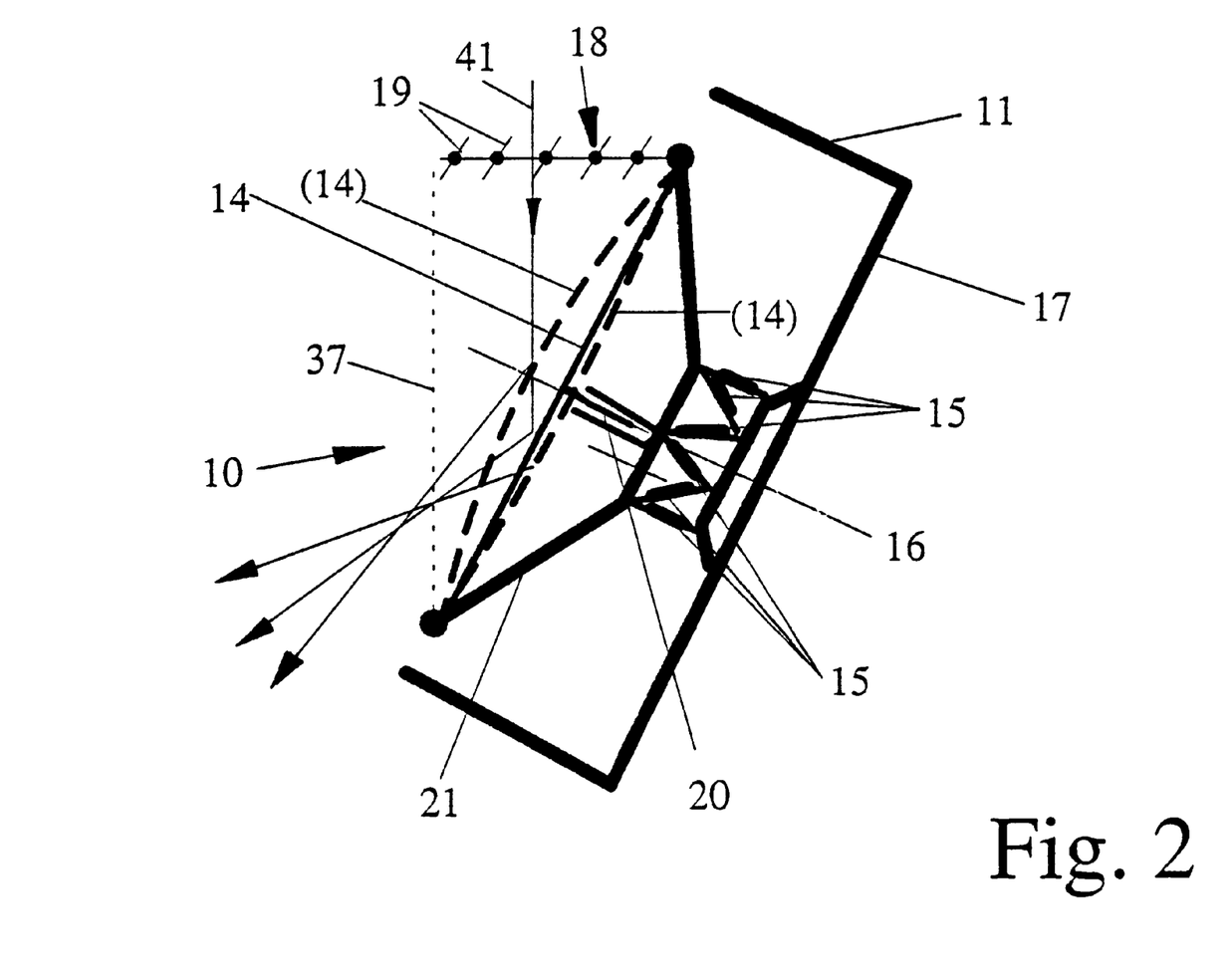
FIG. 2 shows a cross section, represented in enlarged form, through the device in the region of a reflector.
Figure 3:
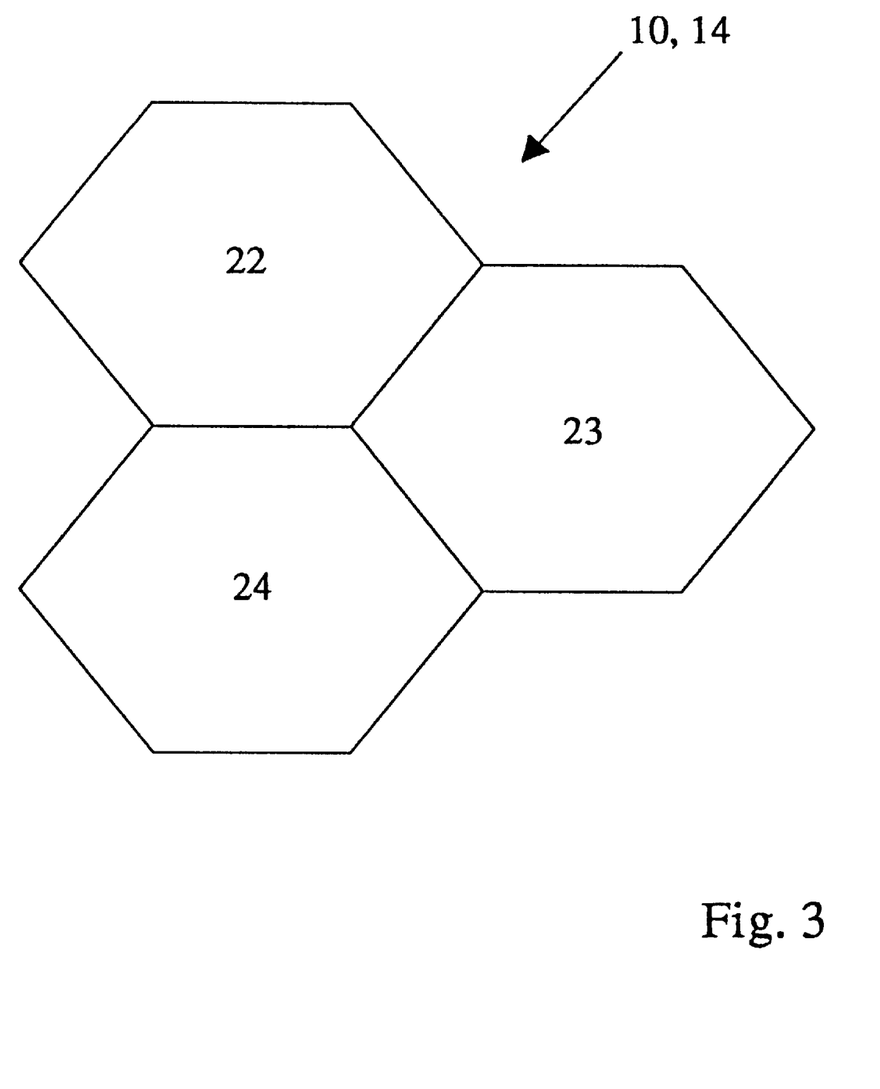
FIG. 3 shows a plan view onto the reflecting surface of a reflector put together from a plurality of partial reflectors.

The device represented in FIGS. 1 to 3 serves for the transmission of information from space to the earth and to regions near the earth. The information may comprise, for example, advertising information.

The device shown here has a multiplicity of reflectors 10. All reflectors 10 are associated with a common retaining means. The retaining means comprises, in this case, a framework 11 which can be folded together and apart and which is preferably three dimensional and which carries the reflectors 10. In place of the framework 11, it is also possible to use grid structures and/or rod systems.

The reflectors 10 are disposed to be distributed in a raster configuration over the base surface of the framework 11. According to FIG. 1, the reflectors 10 are distributed on five rows 12 and seven lines 13 extending perpendicular thereto. In total, the device shown here has thirty five reflectors 10 associated with the framework 11. In principle, any selectable other raster-type distributions of the reflectors 10 can be implemented. It is also feasible to associate a larger or smaller number of reflectors 10 with a device. What is decisive for the arrangement of the reflectors 10 on the respective framework 11 is the nature and the extent of the information to be transmitted. For the transmission of voluminous information, it is also possible to dispose a plurality of devices, for example of the type shown in FIG. 1, alongside one another and/or one above the other.

The framework 11 is designed in such a manner that it is transportable from the earth into space with the reflectors 10 secured thereto, in the folded-together condition. After the device has been transported into space and has entered its orbit there, the framework 11 is unfolded, whereby the reflectors 10 necessarily achieve their raster-type arrangement relative to one another, as is shown, by way of example, in FIG. 1. Alternatively (or additionally) the framework 11 can also be designed so that it can be assembled in space, for example, by astronauts.

According to the representation in FIG. 2, each reflector 10 is disposed at a specified position of the framework 11, namely in each case at a point of intersection of a row 12 and a line 13. The arrangement is configured in such a manner that the entire reflector 10 or at least one part, forming a reflecting surface 14, of the respective reflector 10 is pivotable or rotatable in relation to the framework 11. This can take place, for example, by actuators indicatively represented in FIG. 2, especially spindle-driven piezoactuators 15. This adjustment preferably takes place in such a manner that a longitudinal central shaft 16, extending perpendicular to the reflecting surface 14, of the reflector 10 is pivoted or tilted in relation to the plane 17 of the framework 11. As a result of this, it is in particular achieved that the reflecting surface 14 adopts a position relative to the incident sunlight in which either the latter is reflected to the earth or the sunlight is directed in a direction in which it cannot be perceived by the observer.

Additionally or alternatively, it is feasible to associate with each reflector 10 a darkening device, which in the embodiment of FIG. 2 comprises a louvre 18 which is fixedly disposed at the margin of the reflecting surface 14 and which has a multiplicity of pivotable louvre blades 19. When these are situated in the open position shown in FIG. 2, they allow the solar irradiation through to the reflecting surface 14 for the emission of reflected light beams to the earth. In a closed position (not shown) on the other hand, the louvre 18 blocks the sunlight incident on the reflecting surface 14, so that no light beams which can be reflected to the earth are incident on said surface. Alternatively, a louvre or the like can be disposed on the reflecting surface 14 of each reflector 10 or only of specified reflectors 10.

In FIG. 2, as indicated (broken lines) there is disposed a filter 37 by which specified spectral ranges of the light can be masked out, in order to be able to represent any selectable colors. Filter 37 may comprise an interference filter or polarizing filter.

In the embodiment of FIG. 2, the reflecting surface 14 is variable in its form. Proceeding from a planar form represented by a solid line in FIG. 2, it can be provided with a concave or convex curvature (in each case represented by broken lines in FIG. 2). In this manner, the light point reflected by the reflector 10 onto the earth can be varied in area or the light beams radiated to the earth can be concentrated, focused or defocused. The alteration of the curvature of the reflecting surface 14 is carried out, in the embodiment shown here, by an actuator which is disposed centrally below the reflecting surface 14 and which is designed, in the embodiment shown, as a spindle drive 20 which is fixedly connected to a frame 21 clamping the reflecting surface 14. It is also feasible to dispose a plurality of actuators centrally and/or eccentrically below the reflecting surface 14, in order to generate any selectable curvatures of the same.

FIG. 3 shows a further development of the device. In this further development, the reflecting surface 14 is formed from three partial reflecting surfaces 22, 23 and 24. The partial reflecting surfaces 22, 23 and 24 are, in the embodiment shown, designed in hexagonal fashion and lie alongside one another. In principle however, other basic surfaces of the partial reflecting surfaces 22, 23, 24 are also feasible, for example triangular or quadrangular. The partial reflecting surfaces 22, 23 and 24 are designed so that they emit light of differing colors, namely the three spectral colors red, green and blue. At least two partial reflecting surfaces 22, 23 or 24 but preferably all three partial reflecting surfaces 22, 23 and 24, are adjustable independently of one another in such a manner that their light beams reflected to the earth partially overlap to achieve any selectable color compositions.

Figure 4:
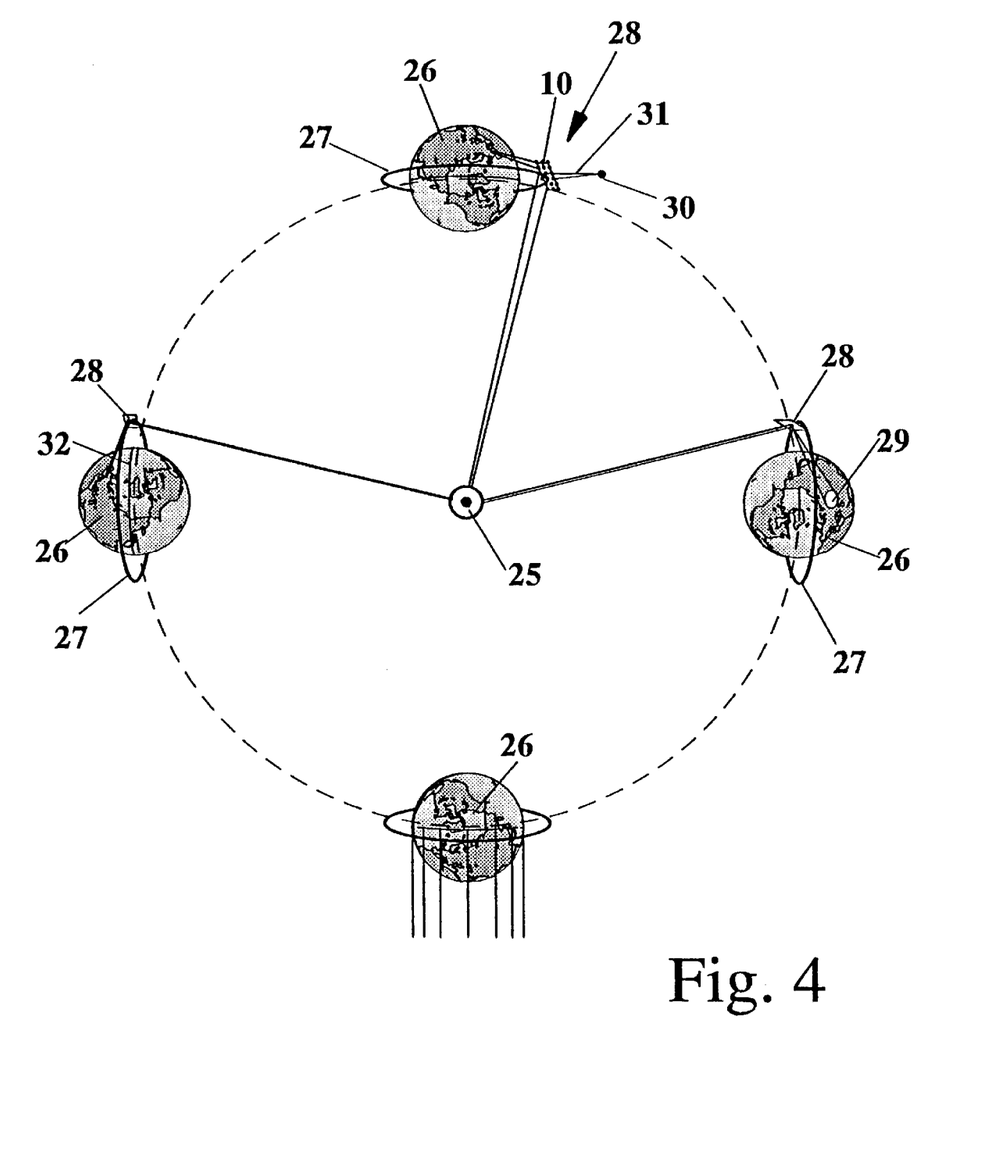
FIG. 4 shows a representation of the arrangement of the device in relation to the earth and to the sun.
Figure 5:
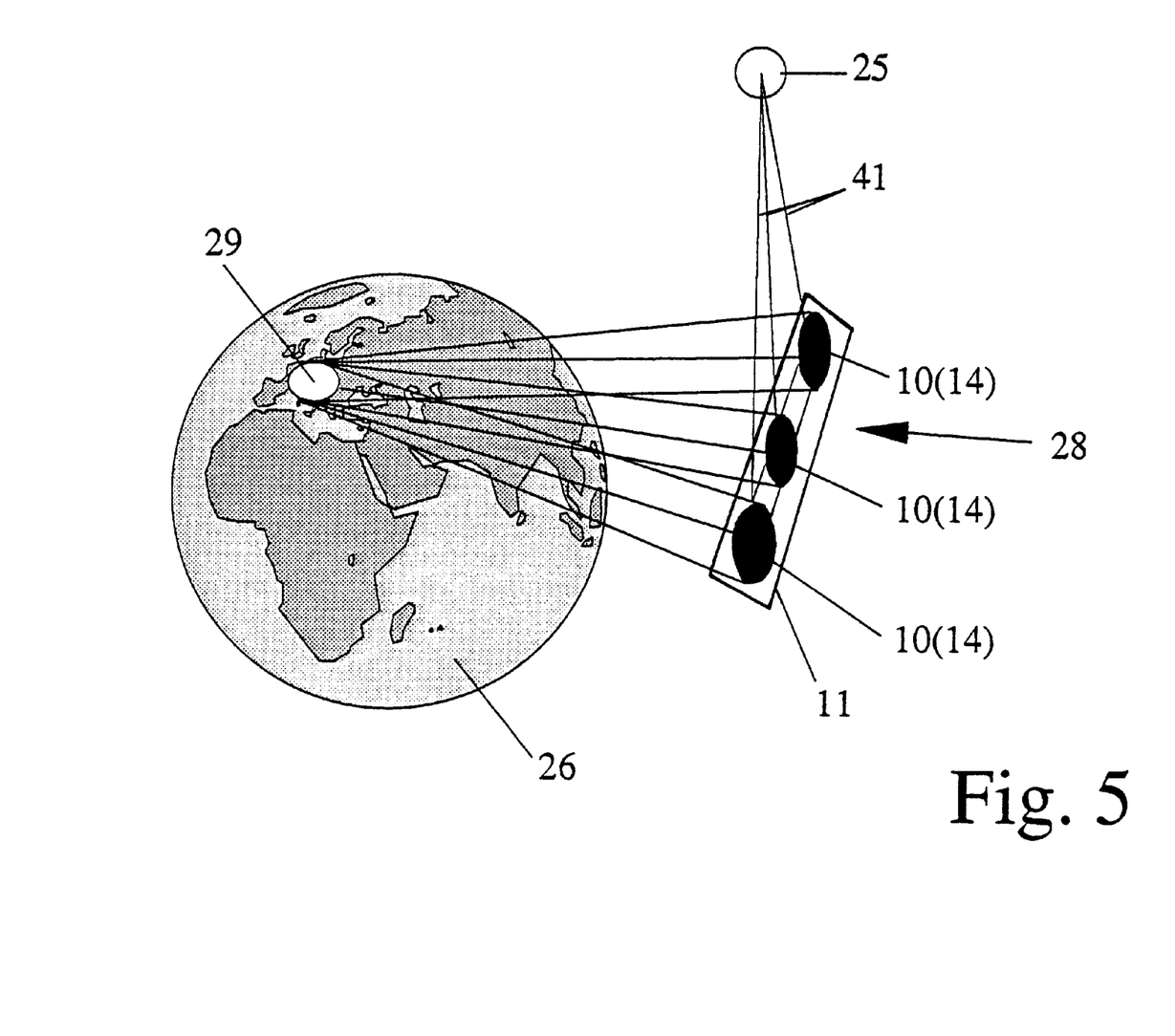
FIG. 5 shows a detail, represented in enlarged form, from FIG. 4.

FIG. 4 shows the function of the device 28. The sun 25 is represented centrally in symbolic fashion and is orbited by the earth 26. The device 28 orbits the earth 26 on an orbit 27 which is in this case sun-synchronous. On this orbit 27 around the earth 26, the sun 25 irradiates onto the reflecting surfaces 14 of the reflectors 10 of the device 28 by its light beams 41 indicated in FIG. 5. The light radiation, reflected in this case by specified reflectors 10, of the sun 25 is sent by the device 28 near to the terminator 32 to the earth. These light beams sent to the earth are in each case visible by the observer on a specified information region 29. In the right hand representation of the earth 26 in FIG. 4, this information region 29 is symbolized by a bright ellipse (represented in enlarged form in FIG. 5). In this case, the information region 29 lies on a night time half of the earth 26, which is directed away from the sun 25. During the night, the light information sent to the earth 26 by the device 28 can be perceived particularly well by the observer. However, it is certainly also feasible, by a corresponding orbit of the device 28 around the earth 26 and/or alignment of the reflectors 10 or of the entire device 28, to direct the information region 29 onto a region of the earth 26 which is illuminated by the sun 25, i.e. at which at the instant concerned it is day time. For this purpose, the radiation intensity must be increased by focusing the light beams in consequence of a corresponding alteration of the curvature of the reflecting surfaces 14.

It becomes evident from the top representation of FIG. 4 that the device 28 has a counterweight 30, which is connected to the framework 11 at a diagrammatically represented arm 31. The counterweight 30 ensures that the device moves on the orbit 27 around the earth 26 in a stable alignment in two directions, and specifically in the flight direction and laterally thereto (gravitational gradient stabilization). This alignment (with an additional stabilization about the longitudinal axis of the arm 31) is selected so that the reflecting surfaces 14 of the reflectors 10 always face the earth 26 and the sun 25 at a predetermined angle, i.e. light beams emanating from the sun 25 can be reflected to the earth 26, when the reflectors 10 are correspondingly set.

According to the invention, the device 28 is constructed in such a manner that only specified reflectors 10 send light beams to the earth 26. In consequence of the raster-type or matrix-type arrangement of the multiplicity of reflectors 10 on the framework 11, selected reflectors 10 may be brought into a position in relation to the sun 25, in which (only) these reflectors 10 enable a light point or a light spot to become visible in the information region 29 on the earth 26. The remaining reflectors 10 are then, on the other hand, situated in a position relative to the sun 25 from which no light beams can pass to the earth 26. Thus, no light points or light spots perceptible by the observer in the information region 29 can be generated by these reflectors 10. In this manner, using the device 28 according to the invention it is possible to form controlled light point or light spot combinations which indicate combinations of numbers or of letters to the observer on the earth 26. Depending upon the size of the device, either numbers and/or letters in a specified sequence or, respectively, a combination of letters which for example makes a specified word, can be sent to the earth. By corresponding alteration of the reflecting surface 14 of controlled reflectors 10 or darkenings of the reflecting surfaces 14, different information can be sent to the earth 26 with the same device 28 in temporal sequence, whereby running texts or moving images or graphics can be transmitted. When using reflecting surfaces comprising the partial reflecting surfaces 22, 23 and 24 shown for example in FIG. 3, this information can be presented in any selectable color.

By way of example, a specified information item can be transmitted in various languages, in that in that region of the earth 26 on which the information is at the instant concerned visible the information is transmitted using a sequence of letters of the desired language.

Furthermore, it is feasible to transmit the information by radiation in the spectrum of the light which is invisible to the human eye. With an appropriate device (for example a sensor which is sensitive in this spectral range) the transmitted information is prepared so that it is perceptible by the observer.

Finally, the desired information can be sent to the earth by a pulsed modulation of the radiated emission intensity of the light of the reflectors 10 (for example by means of Morse code).

Figure 6:
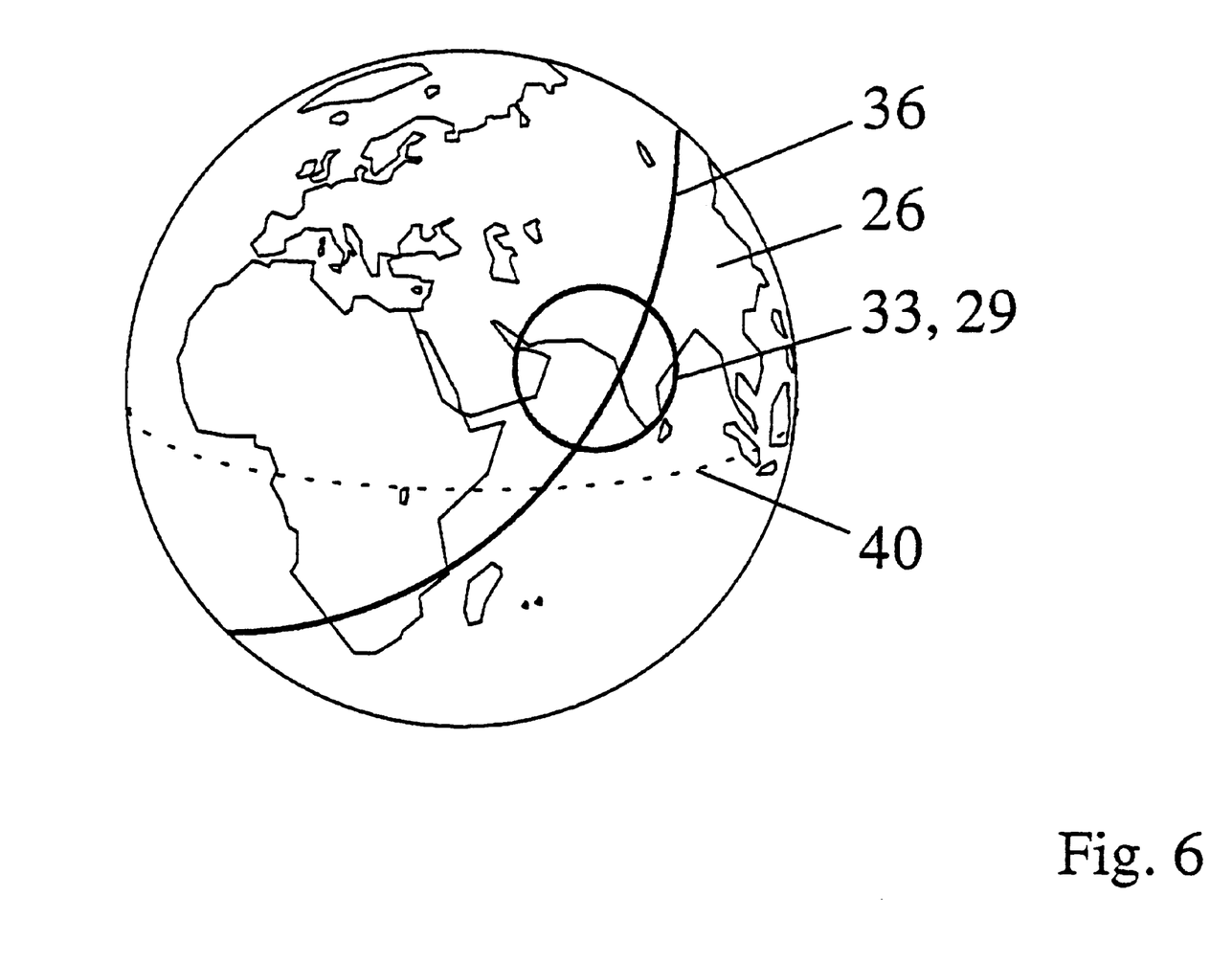
FIG. 6 shows a representation of the orbit of the device around the earth.

FIG. 6 shows an orbit 36 of the device 28, which extends in circular configuration with an inclination to the equator 40. On this orbit 36, the information shown in each instance by the device 28 is instantaneously visible at a specified information region indicated by a circle 33 (which can also be elliptical) on the earth 26. This information region lies on changing regions of the earth 26. Thus, with the movement of the device 28 along the orbit 36 the information becomes constantly visible on other partial regions of the earth 26.

Figure 7:
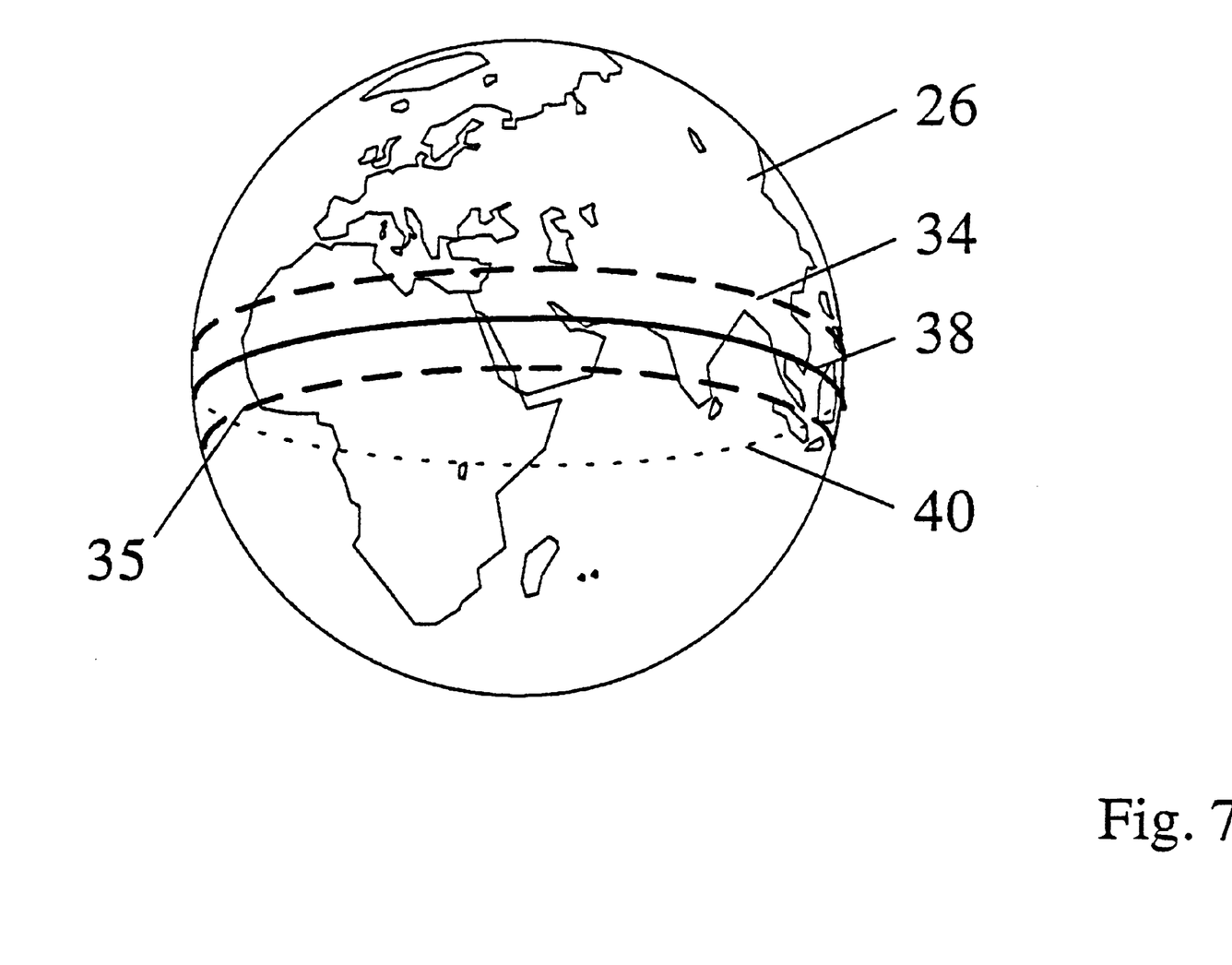
FIG. 7 shows a representation of an alternative orbit of the device around the earth.

FIG. 7 shows, in turn, a circular, non-geostationary orbit 38; in this case, that region on the earth 26 which can be supplied with information during a circuit of the device 28 around the earth 26 is represented by the broken lines 34 and 35 above and below the orbit 38. Information is therefore—albeit at different times—visible only to those observers who are situated in the region of cover between the broken lines 34 and 35. These regions can be altered by the inclination of the orbit 38 (inclination of the orbital plane relative to the equatorial plane). The region can be varied by a corresponding alteration of the orbital altitude.

Figure 8:
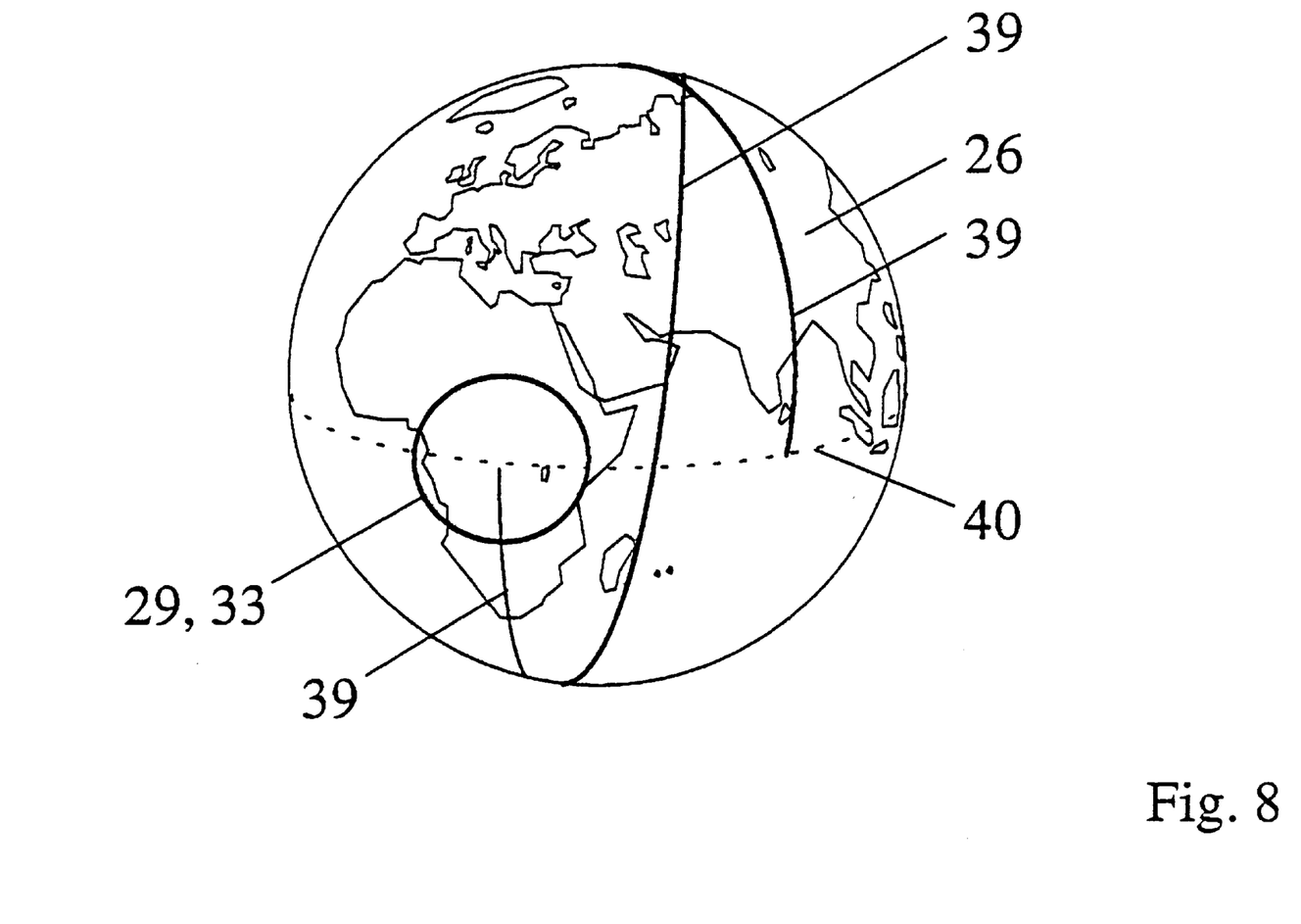
FIG. 8 shows a representation of a further alternative orbit of the device around the earth.

Finally, FIG. 8 shows an orbit 39 which, on account of appropriately selected inclination and orbital altitude, also covers the polar region of the earth 26. As a result of a rotation of the earth 26 away below the orbit 39, it is possible to achieve a global information distribution as a function of the selected orbital parameters within one day.

Particularly suitable is a sun-synchronous, perpetual solar orbit (not shown here) with specified orbital parameters (orbital altitudes of 1,403+3,189 km and inclination of 102.5+115°). In the case of the sun-synchronous, perpetual solar orbit, the device 28 does not at any instant enter the earth's shadow. Accordingly, any selectable information can at all times be made visible within a specified information region 29.

It is also feasible to bring the device 28 onto a geostationary orbit; the consequence of this is that the information region 29 is apparently situated permanently above a specified point or region of the earth 26. The device 28 can then constantly send information to this specified point or region of the earth: however, this can be advantageous where relatively lengthy information is to be transmitted, since there is no risk that in the case of an information transmission lasting for a relatively great length of time a part of the information is no longer capable of transmission to the same information region 29, because the device 28 has moved ahead on the orbit 27 so far that the information region 29 meanwhile extends over another region of the earth 26 and is visible in another region. Finally, in this manner it is possible to provide only a specified region with information.

In order to send specific information from space to Earth, the position of the reflectors 10 or of the darkening means assigned to the reflectors 10 can be adjusted accordingly. Adjustment control is carried out by placing the reflectors 10 in A particular relative arrangement in the grid or by darkening them with the darkening means so that these selected reflectors do not beam light rays of the sun 25 to Earth 26 which can be perceived on Earth as light spots. In contrast, the remaining reflectors 10 are positioned or left undarkened so that they reflect light rays from the sun 25 to Earth 26. Control over the position of the reflectors 10 and their assigned darkening means can be effected by remote means, either from the Earth or from outer space. Thus, it is possible to send a variety of information with the same apparatus. This information can be altered as required at arbitrary intervals by adjusting the position of the reflectors or by controlling the darkening means.

it is also conceivable that the apparatus could be used to transfer such information from space to Earth 26 that represents a part of the overall information. The overall information would then be conveyed by employing either a plurality of apparatuses, preferably arranged next to and/or above one another, or by sending a series of partial information (i.e. a respective part of the overall information) in succession from the same apparatus.

It would also be possible to alter the configuration of the apparatus described above by having the reflectors 10 arranged in a loose matrix , for example as shown in FIG. 1. In this case, the reflectors 10 of the apparatus are not connected to one another by means of the supporting framework 11, the latter therefore being dispensed with. The loose reflectors 10 assume this matrix-like arrangement in space where they maintain their position, orbiting as a whole in this formation, i.e., in synchronous movement. if required, the formation of the nonconnected reflectors can be altered by changing the relative position of the reflectors 10 to one another.

We claim:

1. A process for the generation of information in space that can be perceived directly by an observer on Earth, comprising the steps of:

providing a three-dimensional foldable framework in a space orbit;

placing a plurality of light reflectors arranged in a matrix configuration in said framework, which are capable of collecting light from the sun while in orbit;

aligning only selected ones of said reflectors to reflect visible sunlight from space to Earth as spots coming from space and visible to an observer on Earth;

aligning others of said reflectors so as not to reflect said visible sunlight from space to Earth;

providing a multiplicity of pivotable louvre blades fixedly disposed at a margin of the reflectors to perform said alignment; and assembling a counterweight to the framework by a connecting arm to ensure stable alignment of the device in a flight direction and laterally thereto; wherein only light spots of reflectors adjusted in such a way that they reflect light to the Earth provide information that can be perceived by an observer on Earth;

the reflectors are controlled in such a way that all light spots from reflectors that have been adjusted to reflect sunlight reflect such light spots to Earth, which as a whole provide that information which can be perceived by the observer on Earth; and all reflectors are located in said matrix configuration without being connected to one another; and move in an orbit around the Earth while maintaining said matrix configuration.

2. The process according to claim 1, characterized in that at least one filter is positioned downstream of the reflecting surfaces (14) of the reflectors (10).

3. The process according to claim 1, characterized in that the reflectors (10) are provided with reflecting surfaces (14) which are variable in curvature.

4. The process according to claim 1, characterized in that each reflect or (10) is formed of a plurality partial reflecting surfaces (22, 23, 24), which are designed in such a manner that each partial reflecting surface (22, 23, 24) radiates light beams in one of the three dominant spectral colors to the earth (26).

5. The process according to claim 1, characterized in that the partial reflecting surfaces (22, 23, 24) are adjustable independently of one another in such a manner that any selectable color compositions may be formed by partial overlapping of the beams emitted by the partial reflecting surfaces (22, 23, 24).

6. The process according to claim 1, wherein said moving step comprises moving said reflectors arranged in a matrix configuration along a perpetual solar orbit.

7. The process according to claim 1, wherein said moving step comprises moving said reflectors arranged in a matrix configuration along a sun-synchronous orbit.

8. The process according to claim 1, wherein said moving step comprises moving said reflectors arranged in a matrix configuration along a geostationary orbit.

9. The process according to claim 1, wherein said moving step comprises moving said reflectors arranged in a matrix configuration along a halo orbit.

* * * * *